July 17, 1934.  H. H. McKENNA  1,966,988
PROCESS OF CLASSIFYING SOLIDS

Original Filed Nov. 29, 1927   3 Sheets-Sheet 1

INVENTOR
Hugh H. McKenna.
BY
ATTORNEY

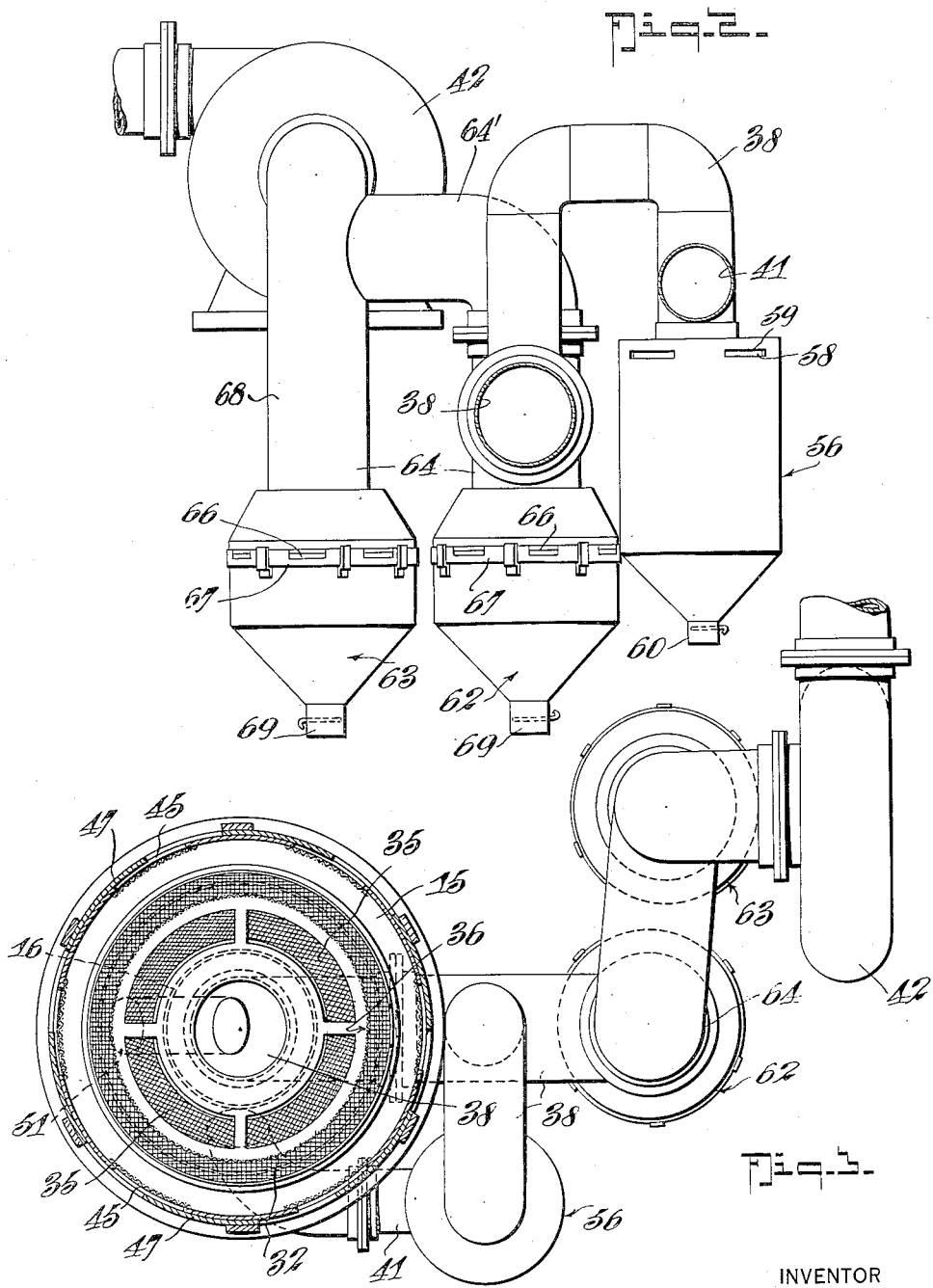

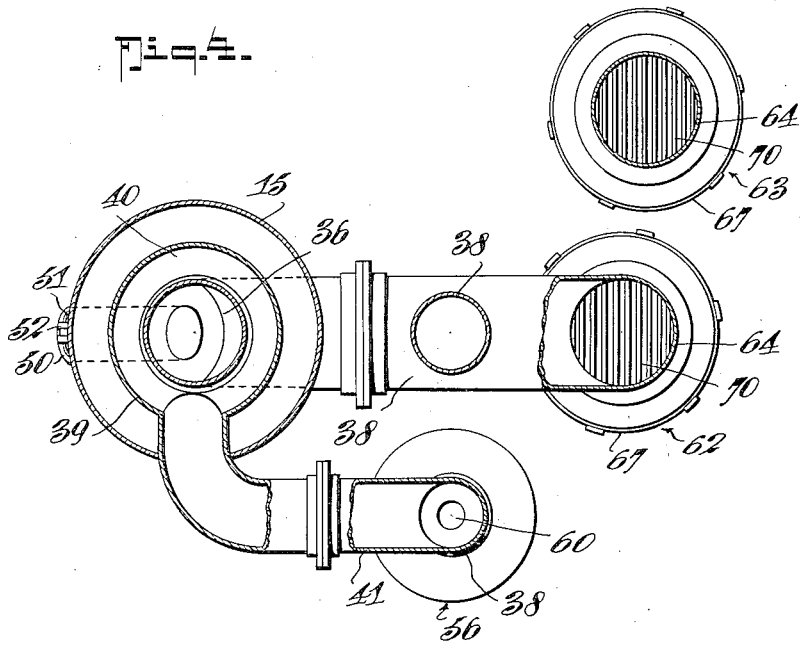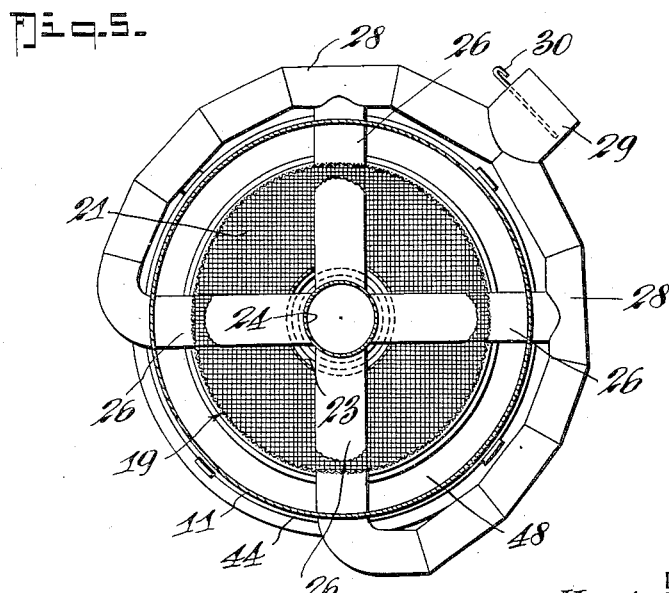

Patented July 17, 1934

1,966,988

UNITED STATES PATENT OFFICE 1,966,988

PROCESS OF CLASSIFYING SOLIDS

Hugh H. McKenna, Los Angeles, Calif., assignor, by mesne assignments, to Wonderful Development Co., Inc., Los Angeles, Calif., a corporation of Nevada Original application November 29, 1927, Serial No. 236,439, now Patent No. 1,837,915, dated December 22, 1931. Divided and this application June 24, 1929, Serial No. 373,186. Renewed April 17, 1933

5 Claims. (Cl. 209—37)

This invention relates to the classifying of mineral particles according to specific gravity and consists of a method of separating the mineral particles mainly by means of controlled air currents.

This application is a division of my prior application, Serial No. 236,439, filed Nov. 29, 1927, patented Dec. 22, 1931, No. 1,837,915.

It is an object of this invention to provide a method of classifying minerals carried in suspension in a current of air by controlling and directing the air current.

It is a further object to agitate comminuted material in controlled air currents in such a manner as to cause the particles of the comminuted material to become suspended in the air currents.

The invention has as a further object the treatment of comminuted material suspended in an air current to effect separation of the course and fine particles and separate classification of the particles according to specific gravity, or crystalline structure.

A further object of the invention is to subject comminuted material to successive operations to effect successive deposition of particles of different minerals having different specific gravities, even when the difference is slight.

One form of apparatus capable of carrying out the method forming the subject matter of the application is shown in the accompanying drawings, in which:

Fig. 2 is a section taken on the line 2—2 of Fig. 1.

Fig. 3 is a section taken on the line 3—3 of Fig. 1.

Fig. 4 is a section taken on the line 4—4 of Fig. 1.

Fig. 5 is a section taken on the line 5—5 of Fig. 1.

Figure 1:
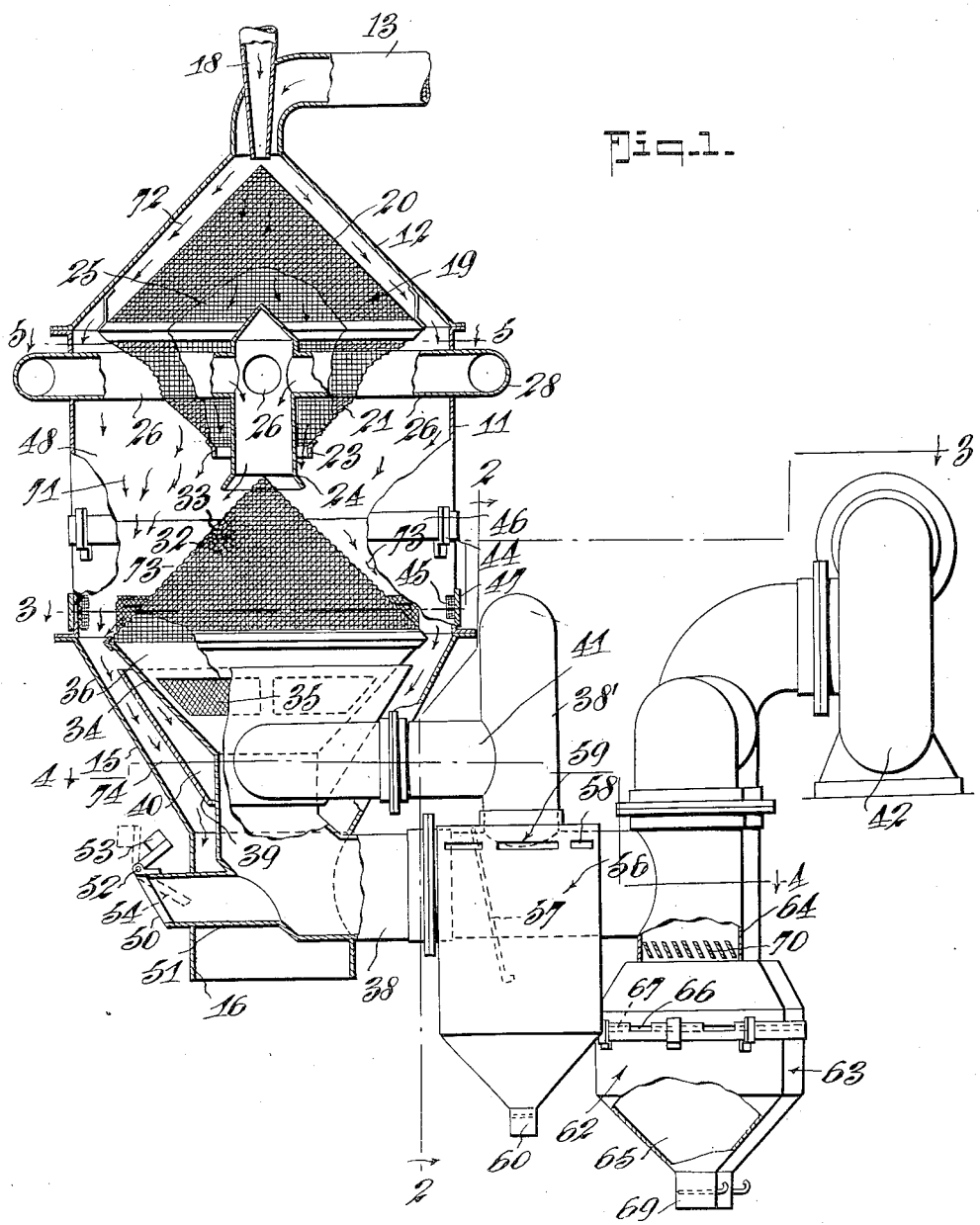
Fig. 1 is an elevation, partly in section, of the apparatus.

Referring to the drawings, the numeral 11 designates a shell, the upper end 12 of which is conical and is provided with an air inlet conduit 13. The lower end 15 is conical and terminates in a gangue discharge 16. A conduit 18 for the admission of ground mineral and gangue passes through the conduit 13 and opens inside the shell 11.

Supported in the upper part of the shell 11 is a breaking device 19 which checks the fall of the comminuted material, scatters any lumps which may be present, and distributes the material evenly through the casing. This breaking device consists of an upper conical screen 20, preferably about 70 mesh, and a lower conical screen 21, preferably about 90 mesh, the bases of which are secured together. The lower part of the lower screen 21 is provided with an opening 23. An air nozzle 24 extends through the opening 23. The upper part of the nozzle 24 is connected by radial pipes 26 to a manifold 28, which has an inlet 29, controlled by a damper 30.

Below the breaking device is a conical screen 33 of 80–100 mesh, the apex of which extends into the lower end of the nozzle 24. The screen 33 is mounted on a conical member 34 which may be provided with screened openings 35. The lower end of the conical member 34 opens with a conduit 38 which extends to the exterior of the shell 11. The space defined by the screen 33 and the conical member 34 is designated 36. A conical baffle 39 is situated between the two conical walls 15 and 34. The space 40 between the baffle 39 and the member 34 communicates with a conduit 41 which extends to the exterior of the shell 11.

The conduit 41 extends horizontally from the shell 11 and opens into the side of one vertical branch of a pipe 38' of inverted U shape. The lower end of the said branch communicates with a trap 56, while the lower end of the other branch of the pipe 38' opens into the conduit 38.

The conduit 38 is provided with a relief valve 50 which is placed at the end of a pipe 51. This relief valve is pivoted at 52 and is provided with a weight 53 which normally holds it in closed position.

The conduit 38 extends horizontally from the shell 11 and opens into a vertical pipe 64, at the lower end of which is a trap 62. The upper end of the pipe 64 is connected by a horizontal pipe 64' with another vertical pipe 68, the lower end of which communicates with a trap 63, and the upper end of which leads to an exhaust blower 42.

The trap 56 is provided with openings 58 controlled by a damper 59, and a large baffle plate 57 to prevent eddy currents. A valved opening 60 permits removal of material collected in the trap.

The traps 62 and 63 are identical and are provided with openings 66 controlled by dampers 67. Valved openings 69 permit collection of the material deposited in the traps. Inclined baffle plates 70 are located immediately above the traps in the pipes 64 and 68.

The blower is set in operation to reduce the air pressure in the various connected pipes and the shell 11. Comminuted material, crushed below 200 mesh, is introduced through the conduit 18.

Air enters around the material through the conduit 13. The material falls upon the conical screen 20 of the breaking device 19, which spreads the material while allowing it to pass into the interior of the breaking device. Any particles larger than 200 mesh pass through the annular space between the shell 11 and the screen 20 and drop downward toward the gangue discharge 16.

The stream of material which has passed through the screen 20 and has become partially suspended in the current of air entering through the conduit 13 is concentrated by the screen 21 toward the opening 23. A current of air, preferably heated, enters the device through the nozzle 24 and spreads over the screen. Two series of openings 44 and 45, controlled by dampers 46 and 47 admit two streams of air. Since the reduced pressure is primarily in the space 36 below the screen 33, the three streams of air from the nozzle 24 and the openings 44 and 45 converge toward the screen from different angles. This results in eddy currents in the space 48 above the screen 33, which cause violent agitation of the comminuted material. This agitation has the effect of thoroughly cleaning the mineral particles of silt and dust and causing each particle to become suspended in the air current.

Most of the material fine enough to pass through the screen 33 is drawn through the screen into the space 36 and on into the conduit 38. Particles of material too large to pass through the screen, and any particles of material that escape the current of air passing through the screen are carried into the space between the conical members 15 and 34. A current of air is being drawn from this space over the upper edge of the baffle 39 into the space 40 and the conduit 41. Part of this air is drawn upwardly through the gangue discharge 16, and part is drawn from above the screen 33. Due to the inclination of the walls, the material is separated at this point according to specific gravity, the heavier material falling down through the discharge opening 16, and the lighter being drawn with the current of air into the space 40 and the conduit 41.

This material passes through the conduit 41 into the pipe 38'. The upward movement of the air current at this point tends to cause deposition of all the material carried in the air current into the trap 56, located at the lower end of the vertical branch of the pipe 38'. This tendency is resisted by a current of air entering the trap through the openings 58 and moving upwardly into the pipe 38'. By adjusting the amount of air entering the trap by means of the damper 59, the heavier material can be caused to deposit in the trap, while the lighter is carried through the pipe 38' into the conduit 38.

The material drawn from the space 36 and that carried through the pipe 38' moves along the conduit 38 until the traps 62 and 63 are reached, at which points further separations according to specific gravity take place. All material having a specific gravity lower than the mineral being collected, such as dust, passes out through the blower.

It will be seen that the complete process consists of agitating the comminuted material by means of interfering, converging air currents, separating the particles of the material according to size, and separately classifying the resulting streams of material according to specific gravity.

Specifically, the agitation step consists of directing a current of air against the apex of a conical screen, and directing a stream of comminuted material at the screen from above the air; and directing a plurality of additional air currents against the screen from different angles. The resulting agitation thoroughly cleans and separates the particles of the material. The fine particles, which may be readily and accurately classified in the traps, pass through the screen. The coarser particles, and such material as does not pass through the screen, is directed into an annular discharge passage, and a current of air is directed upwardly through said material, allowing only the gangue that is heavier than the mineral being collected to pass through the discharge opening. Substantially the same method is involved in the operation of all of the traps. The stream of air and suspended material is deflected upwardly to tend to cause deposition of the suspended material, and a current of air is directed upwardly through the material to prevent deposition of the lighter portion thereof.

The invention comprehends variations in the process within the scope of the appended claims. Any suitable type of apparatus may be utilized in carrying out the process, the foregoing detailed description of one form of apparatus being for the purpose of illustration only.

I claim:

1. In a process of classifying comminuted material; the step of agitating said material to separate the particles thereof, comprising directing a stream of material and a current of air against and past an inclined screen, and directing a plurality of currents of air against said screen at different angles thereto, to cause agitation of said material at the confluence of said currents.

2. The process of classifying comminuted material, consisting of reducing the air pressure in a chamber, admitting a stream of comminuted material into the chamber and allowing the same to fall by gravity against an inclined surface, admitting air into the chamber in such a manner as to create a current of air moving against the direction of motion of the stream of material to cause agitation of the same, directing the material through a discharge opening, and admitting a current of air into the chamber through the said discharge opening to prevent the lighter portion of said material from passing through said opening.

3. In a process of the class described, the improvement which consists of suspending comminuting material in a stream of air, moving the stream of air and suspended material horizontally and then deflecting it upwardly to tend to cause deposition of the material by gravity and inertia, and directing a jet of air at an angle upwardly through the material at the point of deflection and against the direction of motion thereof.

4. The process of conveying and exhausting light gangue and the like which includes suspending the material in a current of air, moving the stream of air and suspended material horizontally and then deflecting it upwardly by means of an exhaust blower, and directing a jet of air upwardly at an angle through the material at the point of deflection and against the direction of motion thereof to prevent separation of such material from the stream of air.

5. A process of separating and classifying ore comprising pulverizing the ore bearing rock, introducing the pulverized material into a separator apparatus, drawing a stream of air through the apparatus, scattering and diffusing the material through the air stream and entraining therein the powder and finer particles, separating and discharging any particles too large to be effectively carried by the air stream, subjecting the stream of air and entrained material to changes of direction to separate from the air stream the particles within a pre-determined range of specific gravities, introducing into the stream of air and entrained material intersecting streams of air of such force and direction as to prevent the separation therefrom of particles within said range of specific gravities having certain crystalline structures, while permitting the separation of other particles having other crystalline structures, and separately collecting the material so classified.

HUGH H. McKENNA.